United States Patent
Lu et al.

(10) Patent No.: US 9,450,741 B2
(45) Date of Patent: Sep. 20, 2016

(54) METHOD, SYSTEM, AND DEVICE FOR WORKING ON TDD CELL

(75) Inventors: Yang Lu, Beijing (CN); Fangli Xu, Beijing (CN); Jing Liang, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 354 days.

(21) Appl. No.: 13/991,897

(22) PCT Filed: Nov. 30, 2011

(86) PCT No.: PCT/CN2011/083207
§ 371 (c)(1),
(2), (4) Date: Aug. 20, 2013

(87) PCT Pub. No.: WO2012/075900
PCT Pub. Date: Jun. 14, 2012

(65) Prior Publication Data
US 2013/0322305 A1  Dec. 5, 2013

(30) Foreign Application Priority Data
Dec. 10, 2010 (CN) .......................... 2010 1 0583852

(51) Int. Cl.
*H04L 5/14* (2006.01)
*H04W 48/12* (2009.01)
(Continued)

(52) U.S. Cl.
CPC .............. *H04L 5/14* (2013.01); *H04B 7/2656* (2013.01); *H04W 48/12* (2013.01); *H04W 48/08* (2013.01)

(58) Field of Classification Search
CPC ... H04W 48/12; H04W 48/20; H04W 48/08; H04W 72/02; H04W 88/06; H04L 5/14; H04L 5/22
See application file for complete search history.

(56) References Cited

U.S. PATENT DOCUMENTS

| 2001/0003095 A1* | 6/2001 | Benz et al. ................... 455/517 |
| 2004/0192313 A1* | 9/2004 | Otting ........................... 455/446 |

(Continued)

FOREIGN PATENT DOCUMENTS

| CN | 101741710 A | 6/2010 |
| CN | 101772191 A | 7/2010 |

(Continued)

OTHER PUBLICATIONS

PCT International Search Report for PCT Counterpart Application No. PCT/CN2011/083207, 4 pgs., (Feb. 23, 2012).

(Continued)

*Primary Examiner* — Hoang-Chuong Vu
(74) *Attorney, Agent, or Firm* — Blakely, Sokoloff, Taylor & Zafman LLP

(57) ABSTRACT

Embodiments of the present application relate to the technical field of radio communication, and particularly to a method, system, and device for working on a TDD cell for enabling a UE to work on an asymmetric TDD cell. According to the embodiments of the present application, the method comprises: A network side device determining uplink parameter information of the asymmetric TDD cell; and the network side device putting the uplink parameter information into system information and sending the system information to a terminal to instruct the terminal to work on the corresponding asymmetric TDD cell according to the system information. In the embodiments of the present application, the uplink parameter information is added to the system information so that the terminal can work on the asymmetric TDD cell according to the system information, thereby improving the efficiency of the terminal.

20 Claims, 4 Drawing Sheets

(51) Int. Cl.
*H04B 7/26* (2006.01)
*H04W 48/08* (2009.01)

(56) References Cited

U.S. PATENT DOCUMENTS

| | | | |
|---|---|---|---|
| 2009/0196163 A1* | 8/2009 | Du | H04L 5/0046 370/204 |
| 2009/0201838 A1 | 8/2009 | Zhang et al. | |
| 2011/0188396 A1* | 8/2011 | Jung et al. | 370/252 |
| 2011/0244869 A1* | 10/2011 | Olofsson et al. | 455/442 |
| 2011/0305290 A1* | 12/2011 | Kim et al. | 375/267 |
| 2012/0051306 A1* | 3/2012 | Chung et al. | 370/329 |
| 2012/0058772 A1* | 3/2012 | Kazmi et al. | 455/450 |

FOREIGN PATENT DOCUMENTS

| | | |
|---|---|---|
| CN | 101772220 A | 7/2010 |
| CN | 102026392 A | 4/2011 |
| CN | 102300158 A | 12/2011 |

OTHER PUBLICATIONS

PCT Written Opinion of the International Searching Authority for PCT Counterpart Application No. PCT/CN2011/083207, 17 pages, (Feb. 23, 2012).

PCT Notification Concerning Transmittal of International Preliminary Report on Patentability (Chapter I of the Patent Cooperation Treaty) for PCT Counterpart Application No. PCT/CN2011/083207, 20 pages, (Jun. 20, 2013).

* cited by examiner

--Prior Art--

--Prior Art--

METHOD, SYSTEM, AND DEVICE FOR WORKING ON TDD CELL

CROSS-REFERENCE TO RELATED APPLICATIONS

This patent application is a U.S. National Stage under 35 U.S.C. §371 of International Application No. PCT/CN2011/083207, filed on Nov. 30, 2011, entitled METHOD, SYSTEM, AND DEVICE FOR WORKING ON TDD CELL, designating the United States, and claiming the benefit of Chinese Patent Application No.: 201010583852.X, filed with the Chinese Patent Office on Dec. 10, 2010 and entitled "Method, System and Apparatus for Operation on TDD Cell", which is hereby incorporated by reference in its entirety.

FIELD

The present invention relates to the field of wireless communication technologies and particularly to a method, system and apparatus for operation on a Time Division Duplex (TDD) cell.

BACKGROUND

At present, carrier aggregation is adopted in a Long Term Evolution-Advanced (LTE-A) system. Carrier aggregation refers to inclusion of a plurality of component carriers respectively in the uplink and the downlink in a cell instead of the pattern with inclusion of only one set of carriers in Long Term Evolution (LTE) and earlier wireless communication systems (that is, one uplink carrier and one downlink carrier). For example, some frequency spectrums allocated to the existing systems are aggregated into a large bandwidth for provision to the LTE-A system for use, and at this time the uplink carriers and the downlink carriers in the system can be configured asymmetrically, that is, a UE may occupy N downlink carriers for downlink transmission and M uplink carriers for uplink transmission, where N≠M, as illustrated in FIG. 1A.

Existing aggregation for a User Equipment (UE) takes place in a Frequency Division Duplex (FDD) cell or a symmetric TDD cell. Taking a 2.6 GHz frequency spectrum as an example, there is a currently available TDD and FDD frequency spectrum use scheme as illustrated in FIG. 1B:

Particularly there are two segments of guard bandwidths G1 and G2 reserved between TDD and FDD frequency spectrums so as to avoid interference between them.

In order to improve the efficiency of using the TDD frequency spectrum, it is desirable to be able to make use of these two guard bandwidths G1 and G2 to thereby constitute an asymmetric TDD cell.

In the existing systems, the UE can only operate on an FDD cell or a symmetric TDD cell. However for the LTE-A system, an asymmetric TDD cell may be active for an improved efficiency of using the TDD frequency spectrum. A solution to operation of a UE on an asymmetric TDD cell has been absent so far.

SUMMARY

Embodiments of the invention provide a method, system and apparatus for operation on a TDD cell so as to enable a UE to operate on an asymmetric TDD cell.

An embodiment of the invention provides a method of operation on a Time Division Duplex, TDD, cell, which includes:

a network-side apparatus determining uplink parameter information of an asymmetric TDD cell; and the network-side apparatus placing the uplink parameter information in system information and sending the system information to a UE to instruct the UE to operate on the corresponding asymmetric TDD cell according to the system information.

An embodiment of the invention provides another method of operation on a TDD cell, which includes:

a UE receiving system information including uplink parameter information; and the UE operating on a corresponding asymmetric TDD cell according to the received system information.

An embodiment of the invention provides an apparatus for operation on a TDD cell, which includes:

an information determining module configured to determine uplink parameter information of an asymmetric TDD cell; and a sending module configured to place the uplink parameter information in system information and to send the system information to a UE to instruct the UE to operate on the corresponding asymmetric TDD cell according to the system information.

An embodiment of the invention provides another apparatus for operation on a TDD cell, which includes:

a receiving module configured to receive system information including uplink parameter information; and a processing module configured to operate on a corresponding asymmetric TDD cell according to the received system information.

An embodiment of the invention provides a system for operation on a TDD cell, which includes:

a network-side apparatus configured to determine uplink parameter information of an asymmetric TDD cell, to place the uplink parameter information in system information and to send the system information; and a UE configured to operate on the corresponding asymmetric TDD cell according to the received system information.

At present a network-side apparatus notifies a UE of system information by notifying the UE of only downlink parameter information, and the UE can operate on a symmetric TDD cell according to the downlink parameter information due to the symmetry of the uplink to the downlink but can not operate on an asymmetric cell. In the embodiments of the invention, the addition of uplink parameter information to the system information can enable the UE to operate on an asymmetric TDD cell according to the system information to thereby improve the efficiency of the UE.

DETAILED DESCRIPTION OF THE EMBODIMENTS

In embodiments of the invention, a network-side apparatus places uplink parameter information in system information, and a UE can operate on a corresponding asymmetric TDD cell according to the system information. The addition of the uplink parameter information to the system information in the embodiments of the invention can enable the UE to operate on an asymmetric TDD cell according to the system information to thereby improve the efficiency of the UE.

Particularly the uplink parameter information according to the embodiments of the invention can include uplink frequency information and bandwidth parameter information and can further include other information from which uplink frequencies and bandwidths can be determined.

The embodiments of the invention will be further detailed below with reference to the drawings.

The following description will be given firstly of an implementation with cooperation of the network side and the UE side and lastly of implementations respectively at the network side and the UE side, but this will not mean required cooperation of the network side and the UE side for an implementation, and in fact, problems present at the network side and the UE side can also be addressed in the separate implementations at the network side and the UE side although a better technical effect can be achieved with their cooperation in use.

Figure 1A:
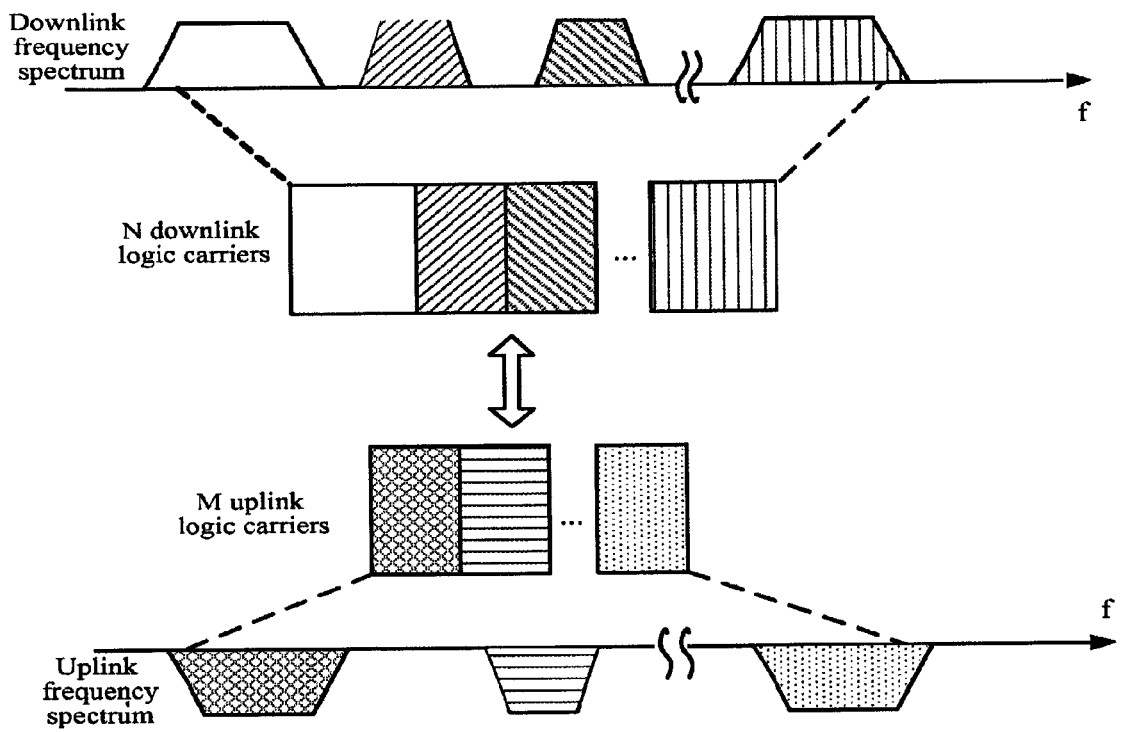
FIG. 1A is a schematic diagram of carrier aggregation.
Figure 1B:
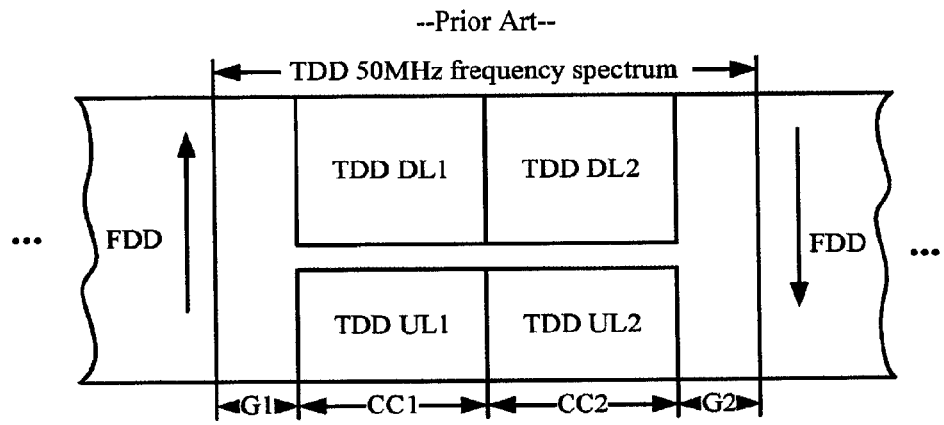
FIG. 1B is a schematic diagram of TDD and FDD frequency spectrums.
Figure 2:
FIG. 2 is a schematic structural diagram of a system for operation on a TDD cell according to an embodiment of the invention.

As illustrated in FIG. 2, a system of operation on a TDD cell according to an embodiment of the invention includes a network-side apparatus 10 and a UE 20.

The network-side apparatus 10 is configured to determine uplink parameter information of an asymmetric TDD cell, to place the uplink parameter information in system information and to send the system information.

The UE 20 is configured to operate on the corresponding asymmetric TDD cell according to the received system information from the network-side apparatus 10.

If the UE 20 can transmit data concurrently on a plurality of carriers (e.g., the UE 20 in support of carrier aggregation), then the network-side apparatus 10 can further send system information of a secondary cell to the UE 20.

Particularly the network-side apparatus 10 can extend System Information BlockType2 (SIB2) in the system information by placing the uplink parameter information in the SIB2; or can add an Information Element (IE) to the system information and place the uplink parameter information in the System Information (SI).

Of course the embodiment of the invention will not be limited to these two implementations, and other implementation in which the uplink parameter information can be borne in the system information can be applicable to the embodiment of the invention.

In an implementation, the network-side apparatus 10 can send the system information in a broadcast and/or dedicated signaling (e.g., Radio Resource Control (RRC) signaling).

Furthermore the system information can be sent in an asymmetric downlink frequency band.

Correspondingly the UE 20 can operate on the asymmetric TDD cell according to the uplink parameter information and other information in the system information (e.g., a Master Information Block (MIB), SIB1, SIB2, etc.) upon reception of the system information including the uplink parameter information.

For example the UE 20 can choose to reside on the asymmetric TDD cell and can transmit data on the asymmetric TDD cell.

In an implementation, if the UE 20 determines that the cell corresponding to the system information is an asymmetric TDD cell upon reception of the system information, then the UE determines from its own capability whether it supports the asymmetric TDD cell.

Specifically the UE 20 firstly searches for a frequency, determines a cell corresponding to the found frequency to be a TDD cell and receives system information of the TDD cell, including uplink parameter information, from a broadcast or dedicated signaling and then determines the TDD cell to be an asymmetric TDD cell, and then the UE determines from its own capability that it can operate on the asymmetric TDD cell corresponding to the system information.

If the UE 20 determines from its own capability that it can not operate on the asymmetric TDD cell corresponding to the system information, then the UE determines the cell to be in a barred status and selects another cell to reside on.

For example this can be determined from whether a receiver of the UE allows operation at two frequencies; whether the spacing between uplink and downlink frequencies of the asymmetric TDD cell lies within a bandwidth of the UE receiver; whether the uplink and downlink frequencies lie within a reception range of the receiver; etc.

It shall be noted that the embodiment of the invention will not be limited to these several implementations, and other implementations in which whether an asymmetric TDD cell is supported can be determined from the capability of the UE can be equally applicable to the embodiment of the invention.

Preferably if the UE 20 is in a connected status, then the UE 20 generates UE capability parameter information from the capability of the UE and reports the UE capability parameter information.

Particularly the UE capability parameter information is information indicating whether the UE supports an asymmetric TDD cell; or the UE capability parameter information is cell information indicating an asymmetric TDD cell supported by the UE.

Specifically the UE capability parameter information can be of the Boolean type or the Enumerate type.

If the UE can support all the asymmetric TDD cells or not support any of the asymmetric TDD cells, then the Boolean type can be adopted, that is, information only indicating whether to support an asymmetric TDD cell.

For example, an IE is newly defined, e.g., as "asy-TDD (asymmetric TDD)" to indicate whether the UE 20 supports an asymmetric TDD cell, and this parameter is of the Boolean type. If the UE 20 supports an asymmetric TDD cell, then the value of the parameter is 'true'; otherwise, the value thereof is 'false'.

If the UE 20 can support a part of asymmetric TDD cells, then the Enumerate type can be adopted, that is, cell information indicating an asymmetric TDD cell supported by the UE, and the cell information here can be a cell identifier or can be other information capable of identifying a cell uniquely.

For example an IE is newly defined, e.g., as "asy-TD-DList" (a list of asymmetric TDD cells) to indicate asymmetric TDD cells supported by the UE 20, and this parameter is of the Enumerate type, where the IE includes cell information of all the asymmetric TDD cells that can be supported by the UE 20.

The UE 20 can alternatively determine from the IE asy-TDDList whether it supports the asymmetric TDD cell corresponding to the system information, and if the asy-TDDList does not include the asymmetric TDD cell which is read by the UE 20 from the system information, then the UE 20 determines that its own capability can not support the asymmetric TDD cell. On the contrary, if the asy-TDDList includes the cell, then the UE 20 determines that it can support the cell.

In an implementation, whether the Enumerate type or the Boolean type is particularly adopted can be indicated in a protocol or notified at the network side to the UE 20 instead of being determined by the capability of the UE 20 to support an asymmetric TDD cell.

Correspondingly upon reception of the UE capability parameter information reported from the UE in a connected status, the network-side apparatus 10 determines from the UE capability parameter information whether the asymmetric TDD cell configured for the UE 20 is an asymmetric TDD cell supported by the UE 20; and if so, then the network-side apparatus 10 sends the system information to the UE 20 in dedicated signaling; otherwise, no system information will be sent to the UE 20.

Particularly the network-side apparatus 10 can further send the uplink parameter information to an adjacent cell via an X2 interface.

The X2 interface is located at a network layer, and the X2 interface is a logic interface between eNBs, and each eNB can have X2 connections with a plurality of adjacent eNBs.

Specifically an X2 interface message IE, Served Cell Information, between adjacent network-side apparatuses 10 needs to be modified for an asymmetric TDD cell. TDD information (info) in the Information Element (IE) needs to have information added thereto to indicate an uplink frequency and bandwidth. For example, they can be indicated respectively by UL EARFCN (i.e., an uplink frequency) and Uplink (UL) Transmission Bandwidth and both of them must be present. If the uplink frequency and the bandwidth parameter are different from the downlink, then a recipient can determine the TDD cell to be an asymmetric TDD cell.

All the relevant parameters to be measured of path loss estimation, a Channel Quality Indicator (CQI), Reference Signal Received Power (RSRP), a Reference Signal Received Quality (RSRQ), etc., of the asymmetric TDD cell can be obtained from downlink measurement of the TDD cell. Furthermore the foregoing signaling can further include new parameter configuration provided dependent upon physical layer and radio frequency demands for this new type of cell, i.e., a newly introduced parameter (e.g., a physical layer parameter, etc.)

Particularly there are a high-version UE and a low-version UE dependent upon different UE versions. For example, a UE of R8 to R10 in LTE is referred to as a low-version UE; and a UE of R11 or higher is referred to as a high-version UE.

For a high-version UE, TDD related system information can be modified. In SystemInformationBlockType2, TDD-related parts of descriptions of the ul-CarrierFreq (an uplink carrier frequency) and ul-Bandwidth (an uplink carrier bandwidth) fields can be modified as follows:

---
ul-CarrierFreq
   For a TDD cell: with the presence of this parameter, configuration of the parameter is enforced, indicating the cell to be an asymmetric TDD cell;
ul-Bandwidth
   For a TDD cell: with the presence of this parameter, configuration of the parameter is enforced, indicating the cell to be an asymmetric TDD cell;

---

Correspondingly a high-version UE determines uplink frequency information and bandwidth parameter information in the system information from the description of the uplink frequency field and the description of the bandwidth parameter field.

Figure 7:
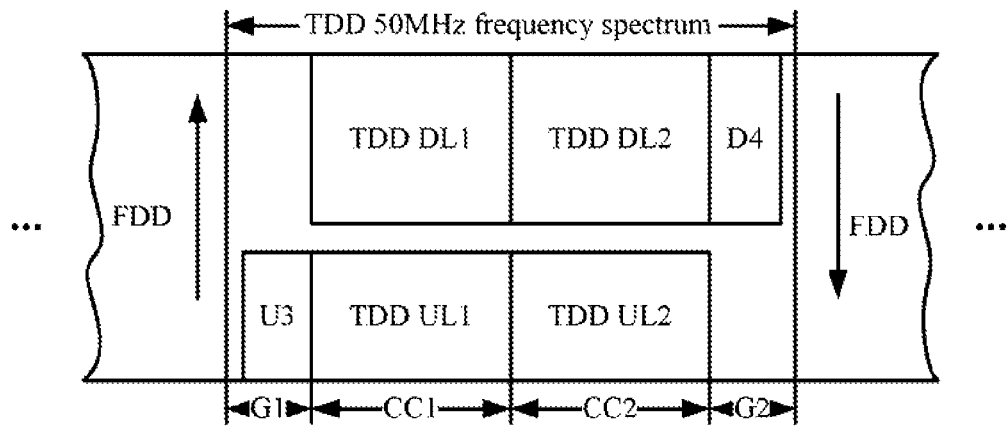
FIG. 7 is a schematic diagram of first frequency spectrums of an asymmetric TDD cell according to an embodiment of the invention.

For a low-version UE, the UE reads system information of the cell on D4 (a specific downlink carrier) in FIG. 7 and obtains an uplink frequency and a bandwidth parameter. At this time the UE will not perform an abnormality handling operation specified in the existing protocol, that is, the uplink frequency and bandwidth of the TDD cell will not be defaulted to be the same as the downlink frequency and bandwidth thereof.

For a low-version UE in no support of an asymmetric TDD cell, the UE can be designed by notifying in advance the UE of a frequency band of the asymmetric TDD cell and then instructing the UE not to search the downlink frequency band of the asymmetric TDD cell.

For a low-version UE in no support of an asymmetric TDD cell, the UE can further firstly determine a cell frequency band corresponding to a cell, determine the cell to be an asymmetric TDD cell upon determining the absence of the determined cell frequency band among preset cell frequency bands and select another cell to reside, where the preset cell frequency bands are those frequency bands, among frequency bands of all the symmetric TDD cells, which do not overlap with the frequency band of the asymmetric TDD cell.

The network-side apparatus according to the embodiment of the invention can be an eNB (e.g., a macro eNB, a home eNB, etc.) or can be a Relay Node (RN) apparatus or can be another network-side apparatus.

Based upon the same inventive idea, there are further provided in embodiments of the invention a network-side apparatus, a UE and a method of operation on a TDD cell, and since these apparatuses and method address the problem under a similar principle to the system for operation on a TDD cell, reference can be made to the implementation of the system for implementations for these apparatuses and method, and a repeated description thereof will be omitted here.

Figure 3:
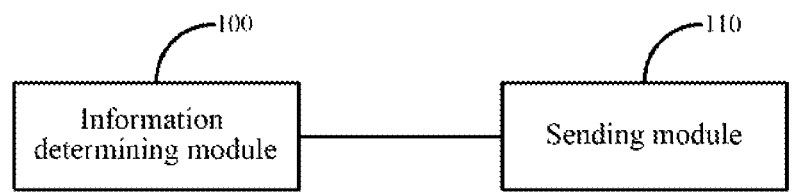
FIG. 3 is a schematic structural diagram of a network-side apparatus according to an embodiment of the invention.

As illustrated in FIG. 3, a network-side apparatus according to an embodiment of the invention includes an information determining module 100 and a sending module 110.

The information determining module 100 is configured to determine uplink parameter information of an asymmetric TDD cell.

The sending module 110 is configured to place the uplink parameter information in system information and to send the system information to a UE to instruct the UE to operate on the corresponding asymmetric TDD cell according to the system information.

Particularly the sending module 110 sends the system information in a broadcast and/or dedicated signaling in an asymmetric downlink frequency band.

Preferably the sending module 110 sends the system information in dedicated signaling upon determining, from received UE capability parameter information reported from the UE in a connected status, the asymmetric TDD cell configured for the UE to be an asymmetric TDD cell supported by the UE.

Particularly the UE capability parameter information is information indicating whether the UE supports an asymmetric TDD cell; or the UE capability parameter information is cell information indicating an asymmetric TDD cell supported by the UE.

In an implementation, the sending module 110 can further send the uplink parameter information to an adjacent cell via an X2 interface.

Figure 4:
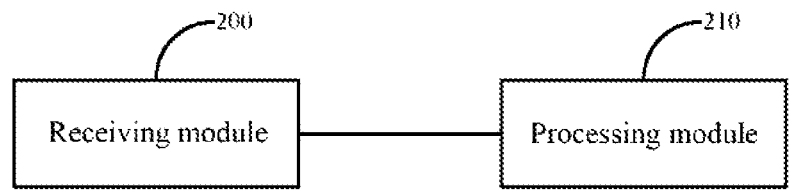
FIG. 4 is a schematic structural diagram of a UE according to an embodiment of the invention.

As illustrated in FIG. 4, a UE according to an embodiment of the invention includes a receiving module 200 and a processing module 210.

The receiving module 200 is configured to receive system information including uplink parameter information.

The processing module 210 is configured to operate on a corresponding asymmetric TDD cell according to the received system information.

Particularly the processing module 210 determines a cell corresponding to a found frequency to be a TDD cell and receives system information of the TDD cell, including uplink parameter information, from a broadcast or dedicated signaling and then determines the TDD cell to be an asymmetric TDD cell and determines from its own capability that it can operate on the asymmetric TDD cell corresponding to the system information, and then operates on the corresponding asymmetric TDD cell according to the received system information.

If the processing module 210 determines from its own capability that it can not operate on the asymmetric TDD cell corresponding to the system information, then the processing module determines the cell to be in a barred status and selects another cell to reside on.

Particularly in a connected status, the processing module 210 generates UE capability parameter information from the capability of the UE and reports the UE capability parameter information.

Particularly the UE capability parameter information is information indicating whether the UE supports an asymmetric TDD cell; or the UE capability parameter information is cell information indicating an asymmetric TDD cell supported by the UE.

The system information includes uplink frequency information and bandwidth parameter information; and the processing module 210 determines from a description of an uplink frequency field and a description of a bandwidth parameter field the uplink frequency information and the bandwidth parameter information in the system information.

Figure 5:
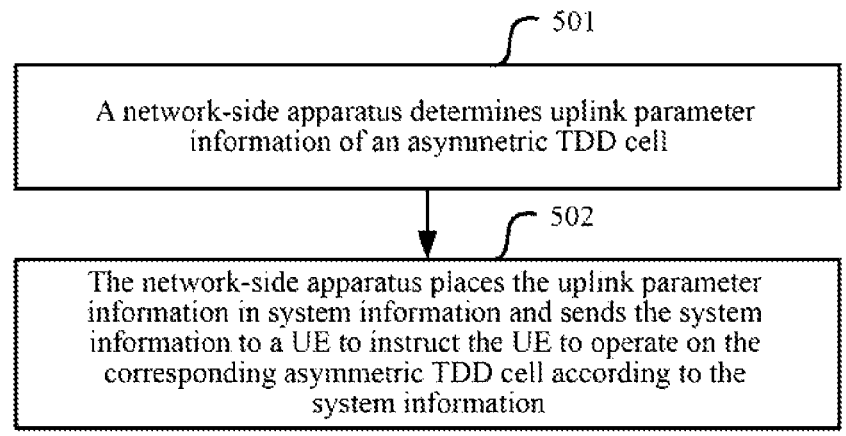
FIG. 5 is a schematic flow chart of a first method of operation on a TDD cell according to an embodiment of the invention.

As illustrated in FIG. 5, a first method of operation on a TDD cell according to an embodiment of the invention includes the following steps:

Step 501. A network-side apparatus determines uplink parameter information of an asymmetric TDD cell; and Step 502. The network-side apparatus places the uplink parameter information in system information and sends the system information to a UE to instruct the UE to operate on the corresponding asymmetric TDD cell according to the system information.

If the UE can transmit data concurrently on a plurality of carriers (e.g., the UE in support of carrier aggregation), then the network-side apparatus can further send system information of a secondary cell to the UE.

In the step 502, the network-side apparatus can extend SIB2 in the system information by placing the uplink parameter information in the SIB2; or can add SI to the system information and place the uplink parameter information in the SI.

Of course the embodiment of the invention will not be limited to these two implementations, and other implementation in which the uplink parameter information can be borne in the system information can be applicable to the embodiment of the invention.

In an implementation, the network-side apparatus can send the system information in a broadcast and/or dedicated signaling. Furthermore the system information can be sent in an asymmetric downlink frequency band.

In the step 502, upon reception of UE capability parameter information reported from the UE in a connected status, the network-side apparatus determines from the UE capability parameter information whether the asymmetric TDD cell configured for the UE is an asymmetric TDD cell supported by the UE; and if so, then the network-side apparatus sends the system information to the UE in dedicated signaling; otherwise, no system information will be sent to the UE, where the UE capability parameter information is information indicating whether the UE supports an asymmetric TDD cell; or the UE capability parameter information is cell information indicating an asymmetric TDD cell supported by the UE.

Particularly the network-side apparatus can further send the uplink parameter information to an adjacent cell via an X2 interface.

Specifically an X2 interface message IE, Served Cell Information, between adjacent network-side apparatuses will be modified for the asymmetric TDD cell. TDD info in the IE will have information added thereto to indicate an uplink frequency and bandwidth. For example, they can be indicated respectively by UL EARFCN and Uplink (UL) Transmission Bandwidth and both of them must be present. If the uplink frequency and the bandwidth parameter are different from the downlink, then a recipient can determine the TDD cell to be an asymmetric TDD cell.

All the relevant parameters to be measured of path loss estimation, a CQI, RSRP, an RSRQ, etc., of the asymmetric TDD cell can be obtained from downlink measurement of the TDD cell. Furthermore the foregoing signaling can further include new parameter configuration provided dependent upon physical layer and radio frequency demands for this new type of cell, i.e., a newly introduced parameter (e.g., a physical layer parameter, etc.)

The network-side apparatus according to the embodiment of the invention can be an eNB (e.g., a macro eNB, a home eNB, etc.) or can be an RN apparatus or can be another network-side apparatus.

Figure 6:
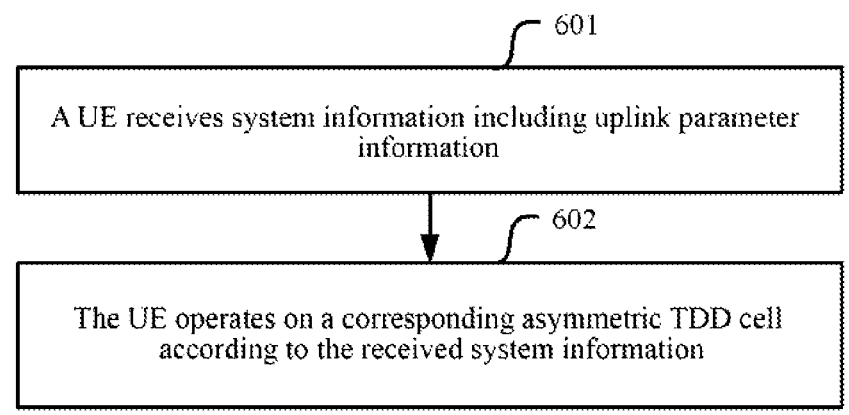
FIG. 6 is a schematic flow chart of a second method of operation on a TDD cell according to an embodiment of the invention.

As illustrated in FIG. 6, a second method of operation on a TDD cell according to an embodiment of the invention includes the following steps:

Step 601. A UE receives system information including uplink parameter information.

Step 602. The UE operates on a corresponding asymmetric TDD cell according to the received system information.

In the step 602, the UE can operate on the asymmetric TDD cell according to the uplink parameter information and other information in the system information upon reception of the system information including the uplink parameter information.

For example the UE can choose to reside on the asymmetric TDD cell and can transmit data on the asymmetric TDD cell.

In an implementation, if the UE determines that the cell corresponding to the system information is an asymmetric TDD cell upon reception of the system information, then the UE determines from its own capability whether it supports the asymmetric TDD cell.

Specifically the UE firstly searches for a frequency, determines a cell corresponding to the found frequency to be a TDD cell and receives system information of the TDD cell, including uplink parameter information, from a broadcast or dedicated signaling and then determines the TDD cell to be an asymmetric TDD cell, and then the UE determines from its own capability that it can operate on the asymmetric TDD cell corresponding to the system information.

If the UE determines from its own capability that it can not operate on the asymmetric TDD cell corresponding to the system information, then the UE determines the cell to be in a barred status and selects another cell to reside on.

Preferably if the UE is in a connected status, then the UE generates UE capability parameter information from the capability of the UE and reports the UE capability parameter information.

Particularly the UE capability parameter information is information indicating whether the UE supports an asymmetric TDD cell; or the UE capability parameter information is cell information indicating an asymmetric TDD cell supported by the UE.

Specifically the UE capability parameter information can be of the Boolean type or the Enumerate type.

If the UE can support all the asymmetric TDD cells or not support any of the asymmetric TDD cells, then the Boolean type can be adopted, that is, information only indicating whether to support an asymmetric TDD cell.

If the UE can support a part of asymmetric TDD cells, then the Enumerate type can be adopted, that is, cell information indicating an asymmetric TDD cell supported by the UE, and the cell information here can be a cell identifier or can be other information capable of identifying a cell uniquely.

In an implementation, whether the Enumerate type or the Boolean type is particularly adopted can be indicated in a protocol or notified at the network side to the UE instead of being determined by the capability of the UE to support an asymmetric TDD cell.

Particularly there are a high-version UE and a low-version UE dependent upon different UE versions. For example, a UE of R8 to R10 in LTE is referred to as a low-version UE; and a UE of R11 or higher is referred to as a high-version UE.

For a high-version UE, TDD related system information can be modified. Correspondingly the high-version UE determines uplink frequency information and bandwidth parameter information in the system information from a description of an uplink frequency field and a description of a bandwidth parameter field.

For a low-version UE, the UE reads system information of the cell on D4 and obtains an uplink frequency and a bandwidth parameter. At this time the UE will not perform an abnormality handling operation specified in the existing protocol, that is, the uplink frequency and bandwidth of the TDD cell will not be defaulted to be the same as the downlink frequency and bandwidth thereof.

For a low-version UE in no support of an asymmetric TDD cell, the UE can be designed by notifying in advance the UE of a frequency band of the asymmetric TDD cell and then instructing the UE not to search the downlink frequency band of the asymmetric TDD cell.

For a low-version UE in no support of an asymmetric TDD cell, the UE can further firstly determine a cell frequency band corresponding to a cell, determine the cell to be an asymmetric TDD cell upon determining the absence of the determined cell frequency band among preset cell frequency bands and select another cell to reside, where the preset cell frequency bands are those frequency bands, among frequency bands of all the symmetric TDD cells, which do not overlap with the frequency band of the asymmetric TDD cell.

Particularly FIG. 5 and FIG. 6 can be combined into a flow of a new method of operation on a TDD cell, that is, firstly the step 501 and the step 502 and then the step 601 and the step 602 are performed.

Several embodiments will be listed below.

As illustrated in FIG. 7, in the schematic diagram of first frequency spectrums of an asymmetric TDD cell according to an embodiment of the invention, two segments of guard bandwidths G1 and G2 are reserved between TDD and FDD frequency spectrums so as to avoid interference between them. In order to improve the efficiency of using the TDD frequency spectrum, uplink data is transmitted on U3 (a specific uplink carrier) and downlink data is transmitted on D4.

First Embodiment

High-Version UE in Support of Asymmetric TDD Cell

An eNB broadcasts system information of the asymmetric TDD cell on D4, where SIB2 includes uplink frequency and bandwidth information. The UE reads the system information of the cell on D4 and obtains an uplink frequency and a bandwidth parameter, and the UE determines the cell to be an asymmetric TDD cell. At this time the UE checks its own capability and determines whether it supports this type of TDD cell. If the UE supports this type of TDD cell, then the UE applies the uplink frequency and the bandwidth parameter in SIB2. The UE can operate normally on the cell after reading other requisite system information.

Second Embodiment

Low-Version UE in Support of Asymmetric TDD Cell

An eNB broadcasts system information of the asymmetric TDD cell on D4, where SIB2 includes uplink frequency and bandwidth information. The UE reads the system information of the cell on D4 and obtains an uplink frequency and a bandwidth parameter. At this time the UE will not perform an abnormality handling operation specified in the existing protocol, that is, the uplink frequency and bandwidth of the TDD cell will not be defaulted to be the same as the downlink frequency and bandwidth thereof, but determines the cell to be an asymmetric TDD cell and then checks the capability of the UE and determines whether it supports this type of TDD cell. If the UE supports this type of TDD cell, then the UE applies the uplink frequency and the bandwidth parameter in SIB2. The UE can operate normally on the cell after reading other requisite system information.

Third Embodiment

Scenario where the Capability of a UE does not Support an Asymmetric TDD Cell

As can be apparent from the descriptions of the first embodiment and the second embodiment, both the high-version UE and the low-version UE which is developed after an asymmetric TDD cell is introduced can operate on the asymmetric TDD cell in different schemes. For these UEs capable to operate on some asymmetric TDD cells, there may be some other asymmetric TDD cells beyond the capability of the UEs, that is, the UEs with a limited capability can not operate on a part of the asymmetric TDD cells. This embodiment addresses an operation method of a UE capable to operate on an asymmetric TDD cell in this scenario.

An eNB broadcasts system information of the asymmetric TDD cell on D4, including uplink frequency and bandwidth information, and since both a high-version UE and a lower-version UE which supports an asymmetric TDD cell determine the cell to be an asymmetric TDD cell, at this time the UE will check the capability of the UE and determine whether it supports this TDD cell. If the UE does not support this TDD cell, then the UE will stop reading the system information of the cell, so the UE can not obtain complete SIB2 and thus determines the cell to be in a barred status and attempts to reside on another cell.

For the UE in a connected status, a UE capability parameter will be reported to the network side which determines from the UE capability whether to configure an asymmetric TDD cell for the UE. For example, an IE asy-TDDList is newly defined to indicate asymmetric TDD cells supported by the UE, and this parameter is of the Enumerate type, where the IE includes cell information of all the asymmetric TDD cells that can be supported by the UE. If the asy-TDDList does not include the asymmetric TDD cell which is read by the UE from the system information, then the UE determines that its own capability can not support the asymmetric TDD cell. On the contrary, if the asy-TDDList includes the cell, then the UE determines that it can support the cell.

Fourth Embodiment

Processing Scheme of a Low-Version UE in No Support of an Asymmetric TDD Cell (Abnormality Handling or No Search for the Frequency)

For some low-version UEs developed before an asymmetric TDD cell is introduced, they do not support operation on an asymmetric TDD cell. However for these UEs, they still can receive system information from D4. This embodiment describes processing of system information of an asymmetric TDD cell received by a UE in no support of the asymmetric TDD cell.

An eNB broadcasts system information of the asymmetric TDD cell on D4, where SIB2 includes uplink frequency and bandwidth information, so a low-version UE developed before an asymmetric TDD cell is introduced will ignore a received uplink frequency and bandwidth parameter in an abnormality handling scheme as currently specified and instead use the same values as a downlink frequency and bandwidth. Thus there may be a situation with inconsistent understanding between the UE and the eNB, so the UE can not access the cell.

For a UE with a determined use area and use frequency band, e.g., a customized UE of a specific operator, the UE can be designed by requiring the UE not to search the downlink frequency band of the asymmetric TDD cell, i.e., not to search D4, to thereby avoid the system information of the cell from being obtained. Furthermore if the frequency band of the asymmetric TDD cell does not overlap with that of any symmetric TDD cell, then the UE can determine from the frequency band whether the cell is an asymmetric TDD cell even if the UE still search D4.

Figure 8:
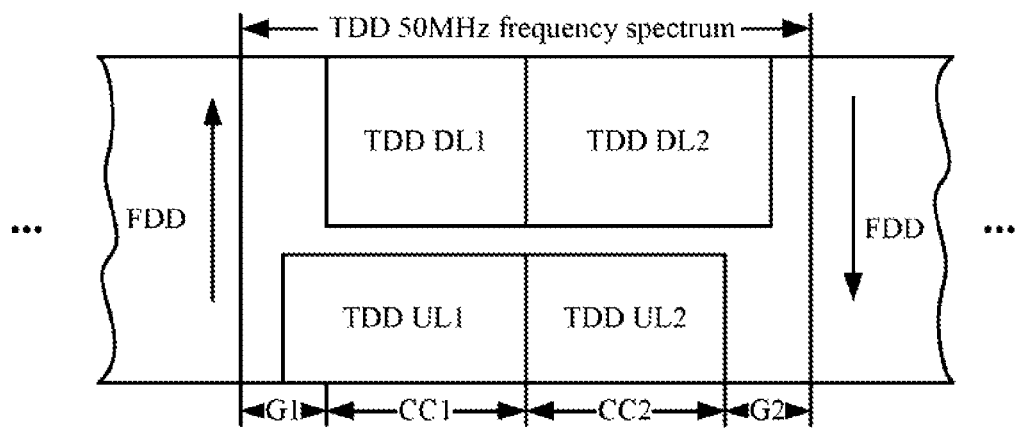
FIG. 8 is a schematic diagram of second frequency spectrums of an asymmetric TDD cell according to an embodiment of the invention.

In addition to the frequency spectrum use schemes mentioned in the first, second, third and fourth embodiments, another frequency spectrum use scheme is also feasible. As illustrated in FIG. 8, an asymmetric TDD cell is composed of an uplink (e.g., UL1) and a downlink (e.g., DL2) at different frequencies, and G1 and G2 are two guard bandwidths desirable to be used.

Fifth Embodiment

Processing Scheme of a High-Version UE in an Asymmetric TDD Cell of FIG. 8

An eNB broadcasts system information of the asymmetric TDD cell on DL2, where SIB2 includes uplink frequency and bandwidth information. The UE reads the system information of the cell on DL2 and obtains an uplink frequency and a bandwidth parameter, so the UE determines the cell to be an asymmetric TDD cell. At this time the UE checks its own capability and determines whether it supports this type of TDD cell. If the UE supports this type of TDD cell, then the UE applies the uplink frequency and the bandwidth parameter in SIB2. The UE can operate normally on the cell after reading other requisite system information. If the UE does not support this type of TDD cell, then the UE will stop reading the system information of the cell, so the UE can not obtain complete SIB2 and thus determines the cell to be in a barred status and attempts to reside on another cell.

The frequency spectrum use scheme of FIG. 8 relates to other sceneries similar to the second, third and fourth embodiments, and a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In the embodiments of the invention, the addition of uplink parameter information to system information can enable a UE to operate on an asymmetric TDD cell according to the system information to thereby improve the efficiency of the UE.

Evidently those skilled in the art can make various modifications and variations to the embodiments of the invention without departing from the spirit and scope of the embodiments of the invention. Thus the invention is also intended to encompass these modifications and variations to the embodiments thereof so long as the modifications and variations come into the scope of the claims appended to the invention and their equivalents.

What is claimed is:

1. A method of operation on a Time Division Duplex, TDD, cell, comprising:
   a network-side apparatus determining uplink parameter information of an asymmetric TDD cell; and
   the network-side apparatus placing the uplink parameter information in system information and sending the system information to a UE to instruct the UE to operate on the asymmetric TDD cell according to the system information,
   wherein the uplink parameter information comprises uplink frequency information, bandwidth parameter information, and other information from which uplink frequencies and bandwidths can be determined, and the asymmetric TDD cell is a cell of which the uplink frequency and the bandwidth parameter are different from the downlink.

2. The method according to claim 1, wherein the network-side apparatus sending the system information comprises:
   the network-side apparatus sending the system information in a broadcast and/or dedicated signaling in an asymmetric downlink frequency band.

3. The method according to claim 1, wherein before the network-side apparatus sends the system information to the UE, the method further comprises:
   the network-side apparatus determining, from received UE capability parameter information reported from the UE in a connected status, the asymmetric TDD cell configured for the UE to be an asymmetric TDD cell supported by the UE; and
   the network-side apparatus sending the system information comprises:
   the network-side apparatus sending the system information in dedicated signaling,
   wherein the UE capability parameter information is information indicating whether the UE supports an asymmetric TDD cell; or the UE capability parameter information is cell information indicating an asymmetric TDD cell supported by the UE.

4. The method according to claim 1, wherein after the network-side apparatus determines the uplink parameter information, the method further comprises:
   the network-side apparatus sending the uplink parameter information to an adjacent cell via an X2 interface.

5. A method of operation on a TDD cell, comprising:
   a UE receiving system information comprising uplink parameter information; and
   the UE operating on a corresponding asymmetric TDD cell according to the received system information,
   wherein the uplink parameter information comprises uplink frequency information, bandwidth parameter information, and other information from which uplink frequencies and bandwidths can be determined, and the asymmetric TDD cell is a cell of which the uplink frequency and the bandwidth parameter are different from the downlink.

6. The method according to claim 5, wherein before the UE operates on the corresponding asymmetric TDD cell, the method further comprises:
   the UE determining a cell corresponding to a found frequency to be a TDD cell and receiving system information of the TDD cell, comprising uplink parameter information, from a broadcast or dedicated signaling and then determining the TDD cell to be an asymmetric TDD cell; and
   the UE determining from its own capability that it can operate on the asymmetric TDD cell corresponding to the system information.

7. The method according to claim 6, wherein after the UE determines the corresponding TDD cell to be an asymmetric TDD cell, the method further comprises:
   when the UE determines from its own capability that it can not operate on the asymmetric TDD cell corresponding to the system information, determining the cell to be in a barred status and selecting another cell to reside on.

8. The method according to claim 7, wherein the method further comprises:
   the UE in a connected status generating UE capability parameter information from a capability of the UE and reporting the UE capability parameter information,
   wherein the UE capability parameter information is information indicating whether the UE supports an asymmetric TDD cell; or the UE capability parameter information is cell information indicating an asymmetric TDD cell supported by the UE.

9. The method according to claim 6, wherein the method further comprises:
   the UE in a connected status generating UE capability parameter information from a capability of the UE and reporting the UE capability parameter information,
   wherein the UE capability parameter information is information indicating whether the UE supports an asymmetric TDD cell; or the UE capability parameter information is cell information indicating an asymmetric TDD cell supported by the UE.

10. The method according to claim 5, wherein the method further comprises:
    the UE in a connected status generating UE capability parameter information from a capability of the UE and reporting the UE capability parameter information, wherein the UE capability parameter information is information indicating whether the UE supports an asymmetric TDD cell; or the UE capability parameter information is cell information indicating an asymmetric TDD cell supported by the UE.

11. The method according to claim 5, wherein the system information comprises uplink frequency information and bandwidth parameter information; and
the UE determines the uplink frequency information and the bandwidth parameter information in the system information from a description of an uplink frequency field and a description of a bandwidth parameter field.

12. An apparatus for operation on a TDD cell, comprising:
an information determining module configured to determine uplink parameter information of an asymmetric TDD cell; and
a sending module configured to place the uplink parameter information in system information and to send the system information to a UE to instruct the UE to operate on the asymmetric TDD cell according to the system information
wherein the uplink parameter information comprises uplink frequency information, bandwidth parameter information, and other information from which uplink frequencies and bandwidths can be determined, and the asymmetric TDD cell is a cell of which the uplink frequency and the bandwidth parameter are different from the downlink.

13. The apparatus according to claim 12, wherein the sending module is further configured:
to send the system information in a broadcast and/or dedicated signaling in an asymmetric downlink frequency band.

14. The apparatus according to claim 12, wherein the sending module is further configured:
to send the system information in dedicated signaling upon determining, from received UE capability parameter information reported from the UE in a connected status, the asymmetric TDD cell configured for the UE to be an asymmetric TDD cell supported by the UE,
wherein the UE capability parameter information is information indicating whether the UE supports an asymmetric TDD cell; or the UE capability parameter information is cell information indicating an asymmetric TDD cell supported by the UE.

15. The apparatus according to claim 12, wherein the sending module is further configured:
to send the uplink parameter information to an adjacent cell via an X2 interface.

16. An apparatus for operation on a TDD cell, comprising:
a receiving module configured to receive system information comprising uplink parameter information; and
a processing module configured to operate on a corresponding asymmetric TDD cell according to the received system information;
wherein the uplink parameter information comprises uplink frequency information, bandwidth parameter information, and other information from which uplink frequencies and bandwidths can be determined, and the asymmetric TDD cell is a cell of which the uplink frequency and the bandwidth parameter are different from the downlink.

17. The apparatus according to claim 16, wherein the processing module is further configured:
to determine a cell corresponding to a found frequency to be a TDD cell, receive system information of the TDD cell, comprising uplink parameter information, from a broadcast or dedicated signaling and then determine the TDD cell to be an asymmetric TDD cell and determine from its own capability that it can operate on the asymmetric TDD cell corresponding to the system information, and then operate on the corresponding asymmetric TDD cell according to the received system information.

18. The apparatus according to claim 17, wherein the processing module is further configured:
upon determining from its own capability that it can not operate on the asymmetric TDD cell corresponding to the system information, to determine the cell to be in a barred status and to select another cell to reside on.

19. The apparatus according to claim 16, wherein the processing module is further configured:
in a connected status, to generate UE capability parameter information from a capability of the UE and to report the UE capability parameter information,
wherein the UE capability parameter information is information indicating whether the UE supports an asymmetric TDD cell; or the UE capability parameter information is cell information indicating an asymmetric TDD cell supported by the UE.

20. The apparatus according to claim 16, wherein the system information comprises uplink frequency information and bandwidth parameter information; and
the processing module is further configured:
to determine the uplink frequency information and the bandwidth parameter information in the system information from a description of an uplink frequency field and a description of a bandwidth parameter field.

* * * * *